Jan. 3, 1967 R. TIMMERMAN 3,296,344
METHOD AND APPARATUS FOR EXPANDING PLASTIC TUBING
Filed May 29, 1963 2 Sheets-Sheet 1
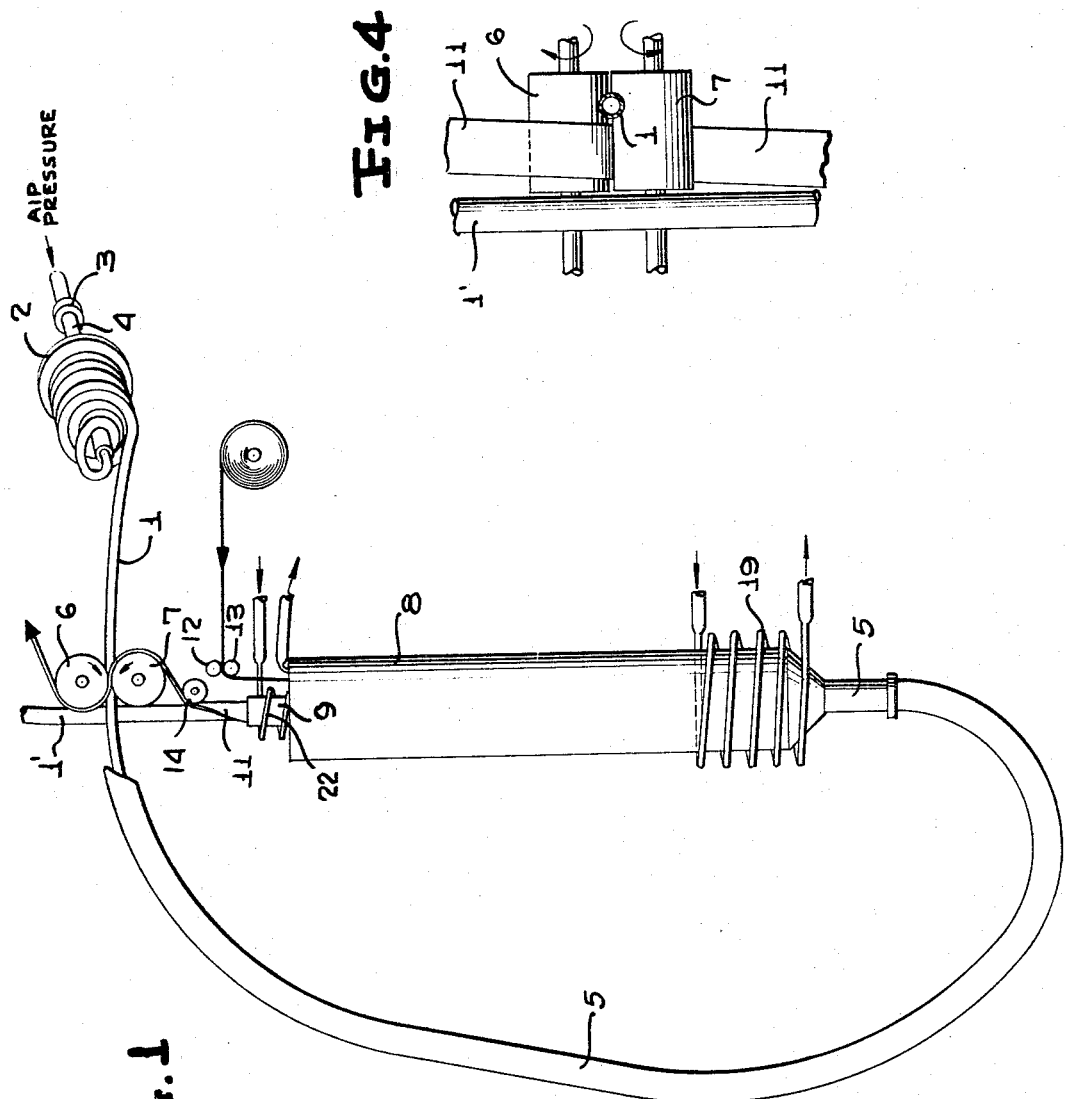
INVENTOR
ROBERT TIMMERMAN
BY Hurvitz + Rose
ATTORNEYS Jan. 3, 1967 R. TIMMERMAN 3,296,344
METHOD AND APPARATUS FOR EXPANDING PLASTIC TUBING
Filed May 29, 1963 2 Sheets-Sheet 2
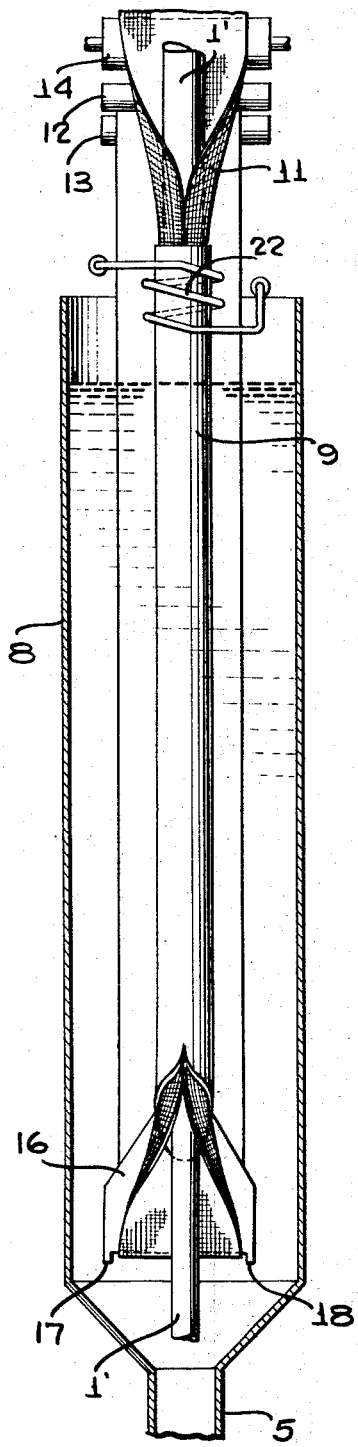
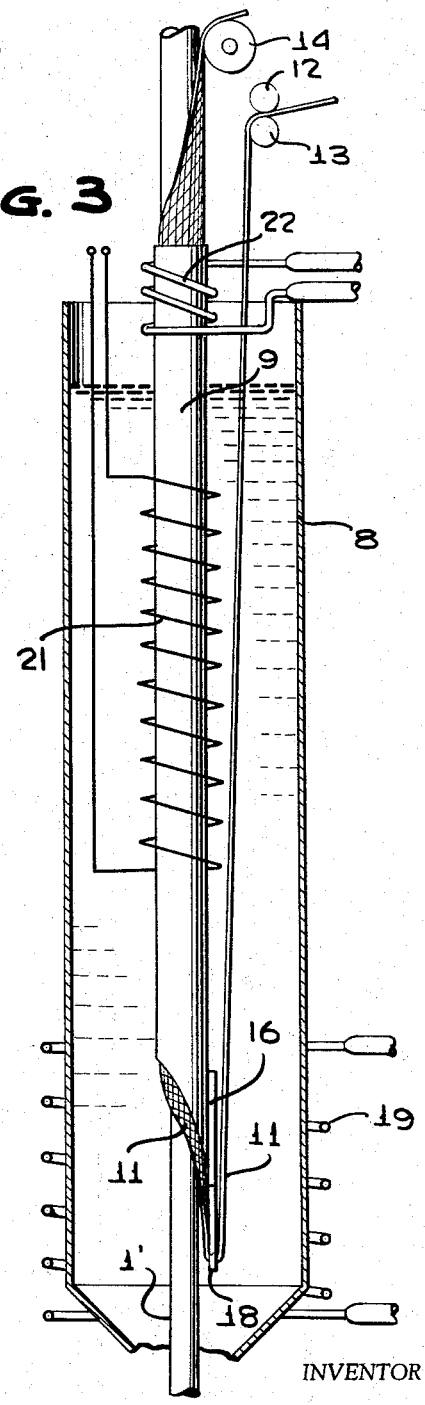
INVENTOR
ROBERT TIMMERMAN
BY *Hurvitz + Rose*
ATTORNEYS

United States Patent Office 3,296,344
Patented Jan. 3, 1967

3,296,344
METHOD AND APPARATUS FOR EXPANDING PLASTIC TUBING
Robert Timmerman, North Massapequa, N.Y., assignor to Radiation Dynamics, Inc., Westbury, N.Y., a corporation of New York
Filed May 29, 1963, Ser. No. 284,081
5 Claims. (Cl. 264—95)

The present invention relates to a method and apparatus for expanding plastic tubing and more particularly to a method and apparatus for effecting the continuous expansion of plastic tubing by the application of heat and internal pressure thereto.

Plastic tubing is normally prepared in a continuous extrusion process by forcing melted plastic from an extruder and through a die. The plastic is then cooled below its melt point so as to set the material. Often it is desirable to expand a plastic tube thus formed to a larger internal and external diameter and normally this is accomplished by subjecting the tube to internal air pressure before the plastic material is cooled below its melt point. So long as the tube is to be expanded to a volume which is considerably greater than its initial volume; that is, the tube is blown up to a very thin walled device, little difficulty is encountered in the operation. However, where it is desired to expand the tube by, for instance, 50% to 200%, the operation is extremely difficult to perform and normally is accomplished on a discontinuous basis. More particularly, the tube is cut into predetermined lengths and the individual lengths are expanded in a mold by subjecting the entire length of the tube to internal pressure and sufficient heat to raise the temperature of the plastic above its melt point. After expansion the plastic is cooled and then withdrawn from the mold.

The present invention is primarily concerned with a method and apparatus for continuously expanding plastic tubing over a limited range by the application of heat and internal pressure. For purposes of explanation only, the range of expansion discussed is between 50 to 200% although greater or lesser expansions are also contemplated herein.

In order for the method and apparatus of continuous expansion in the range contemplated to be commercial the rate of feed of the tube to the expansion apparatus must be relatively fast, the cost of the equipment must be small, the tubing must be expanded to the same size along its entire length in order to obtain acceptable uniformity and the thickness of the wall of the tube must be uniform along the entire length. If internal pressure is applied to a tube which has been heated above its melted point without confining the tube to a mold, the tube expands to oversize in some areas, undersize in others and in some regions balloons outwardly to a very great extent. Such behaviour is the result of such things as air drafts in the expansion area, slight temperature differences in the molten tube, slight internal air pressure changes, etc. If one attempts to set a maximum expansion limit by expanding the molten tubing in a chamber of desired size, the heated plastic adheres to the sides of the chamber and the process is rendered discontinuous unless the chamber moves with the tubing. Apparatus available for providing a continuously moving mold as such is extremely complex and expensive and has been found to be quite unsatisfactory.

It has been noted above that the molten tubing tends to adhere to the chamber wall and this has been found to be true before the solidification of the tubing occurs even if the chamber walls are cooled. Also, since the tubing is under air pressure and therefore is forced into engagement with the chamber walls by a finite pressure, a finite force is required to pull the tubing through the chamber. Since the tube is molten it stretches if pulled from one end and the wall thickness becomes non-uniform.

The present invention overcomes each of the difficulties cited above by providing a stationary forming tube or mold and a moving tape which upon entering the forming tube surrounds the tubing to be expanded. The tape is formed from a material to which the cooled plastic tube does not adhere and the tape is pulled through the forming tube from the output end thereof. Cooling below the melt point of the expanded plastic is accomplished prior to emergence of the expanded tube and the tape from the forming tube, so that the tape may be readily stripped from the expanded tube when they emerge from the mold. Since the tape is pulled through the mold and it completely surrounds the expanded tubing, a uniform force is applied to the plastic tubing throughout the entire length of the heated region in which expansion occurs and no regions of non-uniformity in wall thickness are detected. Provisions are made for feeding the tube to be expanded into the forming tube at the same rate that the forming tape is fed to and withdrawn from the forming tube so that no local areas of stress are developed in the expansion region.

It is an object of the present invention to provide a method and apparatus for the continuous limited expansion of plastic tubing by the application of internal pressure to the tubing in a heated region.

It is another object of the present invention to provide a method and apparatus which is inexpensive, uncomplicated and which is capable of continuously expanding plastic tubing at a relatively rapid rate.

It is another object of the present invention to provide a method and apparatus for the continuous expansion of plastic tubing which does not require moving molds but employing a continuously moving tape to which the plastic does not adhere when cooled.

The above and still further objects, features and advantages of the present invention will become apparent upon consideration of the following detailed description of one specific embodiment thereof, especially when taken in conjunction with the accompanying drawings, wherein:

FIGURE 1 is a schematic drawing in elevation of the apparatus of the present invention;

FIGURE 2 is a partial cross sectional view in elevation of the front of the hot bath well and includes the forming tube and forming tape apparatus;

FIGURE 3 is a view in elevation of the interior portion of the side of the hot bath well region of the apparatus;

FIGURE 4 is a front elevational view of the drive rolls employed in the apparatus.

Referring now specifically to FIGURE 1 of the accompanying drawings, the tubing 1, to be expanded, is arranged on a rotatable drum 2 with the tubing being supplied with internal air pressure through a compressed air swivel 3. The swivel 3 is connected to the tubing 1 through a pipe 4 arranged along the axis of rotation of of the drum 2. Before start of the process, the free end of the tubing 1 is clamped or heat sealed so as to permit the build up of pressure internally thereof. The tubing is passed between a pair of drive rolls 6 and 7 (see FIGURE 4) and then enters a tubing guide 5. The tubing guide 5 is connected to the bottom, as illustrated in FIGURE 1, of a hot bath well 8 in which is disposed a forming tube 9 and other apparatus to be discussed subsequently. A forming tape 11 passes between a pair of guide rolls 12 and 13 and thence downwardly into the hot bath well 8. The tape 11 is withdrawn from the forming tube 9 over a roller 14 and then passes between the rollers 6 and 7 ultimately to a tape take-up device which is not illustrated. It is seen by this arrangement that the tubing 1 is fed into the device at the same rate that the tape 11 is withdrawn therefrom; that is, at the same rate at which the tape 11 moves through the apparatus.

Referring now specifically to FIGURES 2 and 3, the tape 11 passes from the rollers 12 and 13 downwardly through the hot bath well 8 to the bottom thereof. The tape 11 follows a 180° turn around a tape flattening device 16 secured to the bottom and open end of the forming tube 9. The tape, in being drawn over the device 16, is initially flattened, being guided by two downward extensions 17 and 18 formed at opposite edges of the device 16.

The end of the forming tube 9 of this region is open and has a V-shaped end configuration which forms the tape 11 into a circular cross-section as it is drawn upwardly into the tube 9. The tubing 1 enters the forming tube 9 at the same region so that the forming tape is wrapped about the tubing 1 forming substantially one turn thereabout. In actuality, the width of the forming tape 11 is such that a very small gap exists between its two parallel edges. A gap of the order of 1/32 of an inch has been found insufficient to permit imperfections to be formed in the surface of the finished expanded tubing.

A lower cooling unit 19 is disposed about the forming tube at its lower end so that no expansion may occur in this region. The hot bath well is filled almost to the top with a suitable liquid; such as, glycerine, which is heated by any suitable means such as an electric heater 21. A second or upper cooling unit 22 is disposed about the forming tube 9 at the exit end of the hot bath well and immediately above the level of the liquid in the well. The function of this unit is to cool the expanded tubing below its melt point so that no further deformation may occur and the tape 11 does not tend to stick to the expanded tubing. The expanded tubing is designated in the drawings by the reference numeral 1'.

There are three requirements for the tape employed in this system. The tape must retain a high tensile strength at the temperature of the hot bath; it must be chemically unaffected by the hot bath and it must easily release the tube after expansion and subsequent cooling thereof. Materials which have been found to be suitable for the apparatus are Mylar, Teflon, Teflon impregnated fiber glass, fiber glass metal foil and cloth tapes, among others.

In operation the tape 11 is threaded through the system and then the tubing 1 is passed therethrough. The cooling devices 19 and 22 are activated as is the heater 21. The tubing is connected to a take-up reel (not illustrated) and the source for driving the take-up reel and the power rollers 6 and 7 is actuated. Air pressure is now applied through the swivel 3 to the interior of the tubing. As the tubing moves through the forming tube 9 in the region of the hot well bath 8, its temperature is raised to above its melt point and the internal air pressure causes it to expand into engagement throughout its length in the region of the heated fluid to a size determined by the forming tube 9. Movement of expanded tubing is accomplished by pulling the tape 11 from the top of the forming tube and since the tubing 1 is fed to the apparatus at the same rate as the tape 11 both feed and withdrawn, no areas of local stress are developed. It should be noted that the internal air pressure employed is greater than that actually required for expansion to insure uniform expansion of the tubing 1 throughout its entire length in the treating region. It has been found that complete expansion of the tube under all circumstances of operation of the system of the present invention is accomplished by employing a pressure of one and one-half to two times that which would be considered, under a given set of circumstances, to be sufficient.

Numerous types of materials have been successfully processed through the apparatus of the present invention. The bath temperatures employed are determined basically by the material and secondarily by the desired feed rate. For instance, the bath may be held at 250° F. for crosslinked polyethylene and PVC but if feed rates of as high as 15 ft./min. are desired the temperature of the bath should be approximately 380° F. The internal pressure is also a function of temperature but more importantly is a function of the characteristics of the particular material employed. Pressures of from 1½ to 25 lbs./sq. in. have been employed depending on the material. In each case these pressures are 1½ to 2 times the minimum pressure required.

It should be noted that the forming tape 11 may be discontinuous although having quite a long length. On the other hand a continuous tape having a slack region therein may be employed. Suitable devices of this type are disclosed in U.S. Patents 2,936,491 and 3,022,543 among others.

The apparatus of the present invention is of general utility in the tube expansion art. It may be employed with tubings fabricated, for instance, from Teflon, nylon, PVC, vinyl and cross-linked polyolefins. The latter are of particular use in forming heat shrinkable tubings.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A method of expanding hollow plastic tubing comprising feeding an indefinite length of tape parallel to its longitudinal axis through a hollow open-ended mold, applying the force for feeding the tape adjacent the exit end of the mold, feeding a hollow tubing through the mold at the same rate at which the tape is fed therethrough, applying the tube feeding force to the tubing before it enters the mold, encasing the tubing in the tape by folding the tape to form a cylinder of tape having a single longitudinally extending seam, heating the tubing above its melt point interiorly of the mold, applying a pressure to the interior of the tubing to expand the tubing at the temperature employed, cooling the tubing below its melt point as it is withdrawn from the mold and stripping the tape from the tubing after cooling thereof.

2. An apparatus for expanding hollow plastic tubing by a continuous process, comprising an open ended hollow mold, an indefinite length of tape extending through said mold, means for moving said tape parallel to its longitudinal axis by applying a force thereto to pull said tape through said mold, drive means engaging the hollow tubing to apply a force thereto to move the tubing into said mold at substantially the same rate at which said tape is withdrawn from said mold, said tape comprising a flexible, smooth material having low adherence properties to said mold and to the tubing to be expanded, means for encasing the tubing to be expanded in said tape by folding said tape about its longitudinal axis to form a cylinder of tape having a single seam extending parallel to the direction of movement of said tape and the tubing to be expanded, at all points interiorly of said mold, means for heating said tubing above its melt point interiorly of said mold, means for applying pressure interiorly of said tubing to cause said tubing to expand in said mold, means for cooling said tubing below its melt point as it exits from said mold and means for stripping said tape from said tubing after cooling thereof.

3. The combination according to claim 2 comprising a common drive roll arrangement for feeding that tubing to be expanded and pulling said tape.

4. The combination according to claim 1 wherein the pressure applied to the interior of the tubing is one and one-half to two times greater than the minimum pressure required to produce expansion of the tubing.

5. The combination according to claim 2 wherein said means for moving said tape and said drive means comprise a pair of opposed rollers, means for rotatably driving at least one of said rollers, said tape passing from said mold to between said rollers, the tubing to be expanded passing from between said rollers to said mold, said tape and the tubing to be expanded passing between said rollers in opposite directions and being contacted by both said rollers.

References Cited by the Examiner

UNITED STATES PATENTS

| | | | |
|---|---|---|---|
| 906,489 | 12/1908 | Gammeter | 264—95 |
| 1,004,865 | 10/1911 | Gammeter | 264—95 |
| 1,612,509 | 12/1926 | Henderson et al. | 264—95 |
| 2,716,777 | 9/1955 | Hagen | 264—95 |
| 2,936,491 | 5/1960 | Hamlin | 264—95 |

ROBERT F. WHITE, *Primary Examiner.*

ALEXANDER H. BRODMERKEL, *Examiner.*

F. S. WHISENHUNT, *Assistant Examiner.*